3,343,943
HERBICIDAL METHODS AND COMPOSITIONS EMPLOYING 3,4 - DICHLORO - PHENYL DIMETHYL AND METHYLETHYL UREAS
Rayner S. Johnson, Carrcroft, Wilmington, Del., assignor to E. I. du Pont de Nemours and Company, Wilmington, Del., a corporation of Delaware
No Drawing. Filed Jan. 21, 1965, Ser. No. 427,113
3 Claims. (Cl. 71—120)

This application is a continuation-in-part of my copending application Ser. No. 204,613 filed June 22, 1962, now abandoned which in turn was a continuation-in-part of my then copending application Ser. No. 128,391 filed Aug. 1, 1961, now abandoned, which in turn was a continuation-in-part of my then copending application Ser. No. 810,582 filed May 4, 1959, now abandoned, which in turn was a continuation-in-part of my then copending application Ser. No. 744,932 filed June 27, 1958, now abandoned, which in turn was a continuation-in-part of my then copending application Ser. No. 501,183 filed Apr. 13, 1955, now abandoned, which in turn was a continuation-in-part of my then copending application Ser. No. 420,464 filed Apr. 1, 1954, and now abandoned.

This invention relates to dichlorophenyl dialkylureas. More specifically, this invention relates to the two dichlorophenyl dialkylureas represented by the following Formula 1 and to their use in the control of grassy weeds and nutsedge in highly adsorptive soils.

(1) 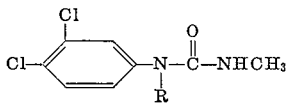

wherein R is methyl or ethyl.

By conventional nomenclature, the compounds represented by Formula 1 are the following:

1-(3,4-dichlorophenyl)-1,3-dimethylurea,
1-(3,4-dichlorophenyl)-1-ethyl-3-methylurea.

During the past decade or so there has been an increasing use of herbicides. Initially the most commonly employed herbicides were the inorganic chemicals such as chlorates, borates and sulfamates and herbicidal oils. While these materials were relatively satisfactory from the standpoint of over-all weed control, they had the disadvantages of requiring relatively large dosages and ordinarily did not control the weeds for a prolonged period. In many instances, only the foliage of the plant was killed back, so that the plants would not die.

More recently there was developed the 2,4-D type of organic chemical herbicide. These materials received widespread acceptance by the industry because they gave a complete kill of plants. However, they had a distinct limitation in that they were selective for broadleaf plants, having little or no effect on grassy plants. Therefore, where both grassy and broadleaf weeds were to be killed, 2,4-D alone would not do the job.

More recently, the well-known substituted urea herbicides were marketed. These materials are characterized by an extremely broad spectrum of herbicidal activity coupled with prolonged persistence in the soil. They will kill most varieties of plants, both broadleaf and grassy, and can be used to sterilize the soil for a prolonged period of time.

While these substituted urea herbicides in a large measure answer the need for both agricultural and industrial herbicides, there are still certain weed problems that can not be handled satisfactorily by these herbicides. For example, an important use for herbicides is the control of weeds growing along railroad rights-of-way. It has been found that the aforementioned substituted urea herbicides will not control certain hard-to-kill grassy weed species growing in highly adsorptive soils on certain railroad ballast, except by application of excessively heavy dosages.

Because none of the conventional substituted urea herbicides are completely satisfactory for all railroad ballast weed problems, it is apparent that there is a real need for a product such as the substituted ureas of the present invention that can be used in conventional powder formulations at low dosages to give prolonged control of grassy weeds growing in highly adsorptive soils on certain railroad ballasts.

In accordance with the present invention, I have found that the two compounds represented by Formula 1 are outstandingly effective for the control of grassy weeds growing in railroad ballasts and other highly adsorptive soils. Unlike the conventional substituted urea herbicides, these compounds give a complete kill of all grassy weeds growing in such soils at a dosage of only a few pounds per acre. Furthermore, this type of treatment gives adequate residual weed control.

I have also found that the compounds of this invention are particularly effective in the control of nutsedge and have growth modification effects at low rates. These growth modification effects include the promotion of flowering and fruiting on leguminous plants.

The substituted ureas of this invention are suitably prepared, for example, by reaction of an N-alkyl dihalophenyl carbamyl chloride with monomethylamine. The process is illustrated by the following equation but it will be understood that by suitable choice of the carbamyl chloride reactant, the other substituted urea of this invention is similarly prepared.

(2) 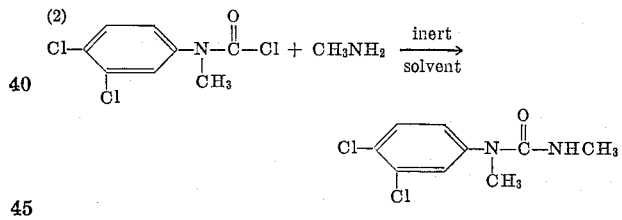

The carbamyl chloride-monomethylamine reaction is most readily carried out in the presence of an inert solvent such as xylene, toluene, dioxane or anisole; and in the presence of an acid acceptor such as pyridine, trimethylamine, triethylamine and the like. The reaction proceeds more rapidly at somewhat elevated temperatures, say at the reflux temperature of the reaction medium. No catalyst is needed.

Alternatively, the compounds of the invention can be prepared by the reaction of an N-alkyl halophenylamine with a methyl isocyanate preferably in an inert solvent. The substituted ureas of the invention are white crystalline solids.

In order to utilize the herbicidal properties of the substituted ureas of the invention, the compounds are formulated by admixture with suitable pest control adjuvants to provide compositions in the form of solutions, dusts, water-dispersible powders and aqueous dispersions or emulsions.

Pest control adjuvants such as the dusts, solvent, wetting, dispersing and emulsifying agents set out in U.S. Patent 2,426,417 can be employed in preparing the herbicidal compositions of the present invention. Other wetting, dispersing and emulsifying agents such as those listed in detail in Bulletin E-607 of the Bureau of Entomology and Plant Quarantine of the U.S. Department of Agriculture and such as those set in "Detergents and Emulsifiers—1964 Annual" by John W. McCutcheon, Inc. may also be used.

The wetting, dispersing and emulsifying agents, commonly called surfactants or surface-active agents, perform effectively as wetters, dispersers and emulsifiers when present in a herbicidal composition of this invention in the range of 0.1 to 1.5% by weight of the total composition. These surfactants further act to increase the herbicidal activity of compositions of this invention when one-half to five parts by weight of surfactant is additionally added for each part by weight of dichlorophenylurea present in a composition.

Dust compositions of the invention contain one of the substituted ureas of the invention in admixture with a finely divided carrier or dust such as talc, pyrophyllite, natural clays, diatomaceous earths and other powdered diluents such as those set out in the aforementioned U.S. patent.

Water dispersible powders of the invention can be prepared by admixing one or both of the compounds of the invention with a surface-active dispersing agent and a finely divided solid carrier or dust such as those mentioned heretofore, the surface-active agent being used in amount sufficient to impart water dispersibility to the powder.

The content of the active compound or compounds of the invention in the pest control compositions will vary according to the manner in which and the purpose for which the composition is to be applied but, in general, will be from 0.5 to 95% by weight of the composition.

The herbicidal compositions are applied either as a spray or dust to the locus or area to be protected from undesirable plant growth. Thus in the control of weeds on railroad ballasts, the compositions can be applied directly to the ballast prior to the germination of weeds. Alternatively, the compositions can be applied to the ground or to the plant foliage after an area is infested with weeds. The compositions are applied, of course, in an amount to exert the desired herbicidal action. The amount of active compound actually applied for destroying or preventing weeds in any given instance will vary with the particular compound actually applied for destroying or preventing used (i.e. whether for short-term or long-term control), the particular weeds to be controlled, and similar variables, as is well known to those skilled in the art.

In order that the invention can be better understood, the following examples are given in addition to those set forth above:

Example 1

Thirty five and four tenths parts by weight of N-methyl-3,4-dichloroaniline dissolved in twenty five parts by weight of xylene is added to a stirring solution of 200 parts by weight of xylene containing twenty two parts by weight of phosgene at reflux temperature. The entire mixture is heated with stirring until hydrogen chloride no longer evolved from the reaction. Last traces of unreacted phosgene are removed by sparging the hot solution with dry nitrogen gas.

After cooling, the resulting N-methyl-3,4-dichlorocarbanilylchloride is treated with 25.5 parts by weight of triethylamine and excess monomethylamine. This mixture is stirred and heated at reflux temperature for a period of one hour. After removing the triethylamine hydrochloride by filtration, the remaining filtrate is distilled under reduced pressure to remove the xylene solvent.

The solid residue is washed with water, dried and recrystallized from a benzene-hexane mixture (1 to 3 ratio) to give 25.3 parts by weight of 1-(3-4-dichlorophenyl)-1,3-dimethylurea melting at 101–102.5° C.

Analysis.—calc'd for $C_9H_{10}Cl_2N_2O$: N, 12.02; Cl, 30.47. Found: N, 12.08; Cl, 30.27.

This compound is formulated into a wettable powder herbicidal composition for application as a spray. The powder application is made by intimately mixing the ingredients using conventional mixing equipment then grinding the mixture to give a powder having an average particle size less than about 50 microns:

| | Percent |
|---|---|
| 1-(3,4-dichlorophenyl) - 1,3-dimethylurea | 75.00 |
| Fuller's earth | 23.75 |
| Sodium lauryl sulfate, 50/ (wetting agent) | 1.00 |
| Methyl cellulose, 15 cps. (dispersing agent) | .25 |

This composition is then extended with water to give a sprayable formulation containing 1% by weight of active ingredient. This aqueous suspension is then sprayed at the rate of ten pounds per acre active ingredients on railroad ballast infested with Johnson grass, Bermuda grass, crabgrass, ryegrass and foxtail. It is found that this treatment gives excellent control of the weeds for a prolonged period of time.

Another portion of this wettable powder formulation is applied to an area infested with nutsedge, a large problem weed in the South and Southwest of the United States. Excellent weed control is obtained employing a dosage of 8–16 pounds per acre active. It is to be noted that diuron [3-(3,4-dichlorophenyl) - 1,1 - dimethylurea] does not give effective control of nutsedge foliage at economical rates.

Example 2

Thirty eight parts by weight of N-ethyl-3,4-dichloroaniline dissolved in twenty five parts by weight of xylene is added to a stirring solution of 200 parts by weight of xylene containing twenty two parts by weight of phosgene at reflux temperature. The entire mixture is heated with stirring until hydrogen chloride no longer evolved from the reaction. Last traces of unreacted phosgene are removed by bubbling dry nitrogen gas through the hot solution.

After cooling, the resulting N-ethyl-3,4-dichlorocarbanilylchloride is treated with 25.5 parts by weight of triethylamine and excess monomethylamine. This mixture is stirred and heated at reflux temperature for a period of one hour. After removing the triethylamine hydrochloride by filtration, the filtrate is distilled under reduced pressure to remove the xylene solvent.

The solid residue is washed with water, dried and recrystallized from a benzene-hexane mixture (1 to 3 volume ratio) to give 22.8 parts by weight of 1-(3,4-dichlorophenyl)-1 - ethyl - 3 - methylurea, M.P. 136–137° C.

Analysis.—calc'd for $C_{10}H_{12}Cl_2N_2O$: N, 11.34. Found: N, 11.38.

This compound is formulated into a dust composition suitable for direct application to weeds using conventional dusting equipment. The dust is made by blending or mixing the ingredients and grinding the mix to give a composition having an average particle size less than about 50 microns:

| | Percent |
|---|---|
| 1 - (3,4 - dichlorophenyl)-1-ethyl-3-methylurea | 20 |
| Talc | 80 |

This dust composition, when applied to grassy weeds infesting railroad ballast, gives excellent weed control using a dosage of 20 pounds per acre of active. This dust also gives good control of nutsedge at a dosage of 20 pounds per acre of active.

Example 3

While the compounds of the present invention have perhaps their greatest utility in controlling nutsedge and in controlling grasses growing in railroad ballast, these compounds additionally possess relatively broad herbicidal properties. These properties are illustrated by the results obtained from application of the aqueous dispersions of water-dispersible powders containing as the essential ingredient 1% by weight of 1-(3,4-dichlorophenyl)-1,3-dimethylurea. Six-week-old Johnson grass seedlings sprayed with this composition in amount sufficient to wet the foliage are found to be dead both as to top growth and roots twenty days after treatment. This same aqueous dispersion, when applied at the rate of five pounds per acre of active to soil planted with weed seed of both broadleaf and grass varieties, is found to kill a wide variety of weeds in the test plots within nineteen days.

A water-dispersible powder containing 80% by weight 1-(3,4-dichlorophenyl) - 1 - ethyl-3-methylurea, 19% by weight fuller's earth, 0.25% by weight goulac, and 0.75% by weight sodium lauryl sulfate, when dispersed in water to give an aqueous spray composition and sprayed at the rate of three pounds per acre to an area planted with corn seed and containing weed seed, gives effective pre-emergence weed control without excessive damage to the corn plants.

Example 4

A water-dispersible powder containing 80% by weight of 1 - (3,4-dichlorophenyl)-1,3-dimethylurea, 19% by weight fuller's earth, 0.25% by weight goulac, and 0.75% by weight sodium lauryl sulfate, when dispersed in 100 gallons Lion Herbicidal Oil No. 6 and sprayed at the rate of twelve pounds (active) per acre gives excellent post-emergence control of existing nutsedge as well as good pre-emergence control of germinating nutsedge tubers. This activity, coupled with favorable residual activity, is noted on a wide range of soil types including a silt loam.

Example 5

| | Percent |
|---|---|
| 1-(3,4-dichlorophenyl) - 1,3-dimethylurea | 78.00 |
| Alkyl naphthalenesulfonic acid, sodium salt | 1.75 |
| Low viscosity methyl cellulose | 0.25 |
| Na$_2$HPO$_4$ (corrosion inhibitor) | 0.80 |
| Synthetic fine silica | 19.20 |

This composition is extended with water and applied pre-emergence at a rate of 0.08 pound of active ingredient per acre to Black Valentine beans planted in a sandy soil. An 18% increase in number of blossoms is noted. At harvest time a 30% increase in number of beans results.

Thus it can be seen that the two compounds of the present invention can be used for many types of weed control. However, by far their greatest utility appears to be for the control of nutsedge and hard-to-kill grassy weeds on highly adsorptive soils on certain railroad ballast where the conventional substituted urea herbicides pose limitations.

I claim:
1. A composition consisting of 20 to 80% by weight of a herbicidally effective amount of a compound selected from the group consisting of 1-(3,4-dichlorophenyl)-1,3-dimethylurea and 1 - (3,4-dichlorophenyl)-1-ethyl - 3-methylurea and 20 to 80% by weight of a pulverulent solid, the composition additionally containing one-half to five parts by weight of a surface-active agent selected from the group consisting of cationic, anionic and non-ionic surface-active agents for each part by weight of dichlorophenylurea.

2. The method for controlling grassy weeds and nutsedge in highly adsorptive soil comprising applying to the weeds a herbicidally effective amount of a compound selected from the group consisting of 1-(3,4-dichlorophenyl)-1,3-dimethylurea and 1-(3,4-dichlorophenyl) - 1-ethyl-3-methylurea.

3. The method for controlling grassy weeds and nutsedge in highly adsorptive soils comprising applying to the soil a herbicidally effective amount of a compound selected from the group consisting of 1-(3,4-dichlorophenyl)-1,3-dimethylurea and 1-(3,4-dichlorophenyl)-1-ethyl-3-methylurea.

References Cited

UNITED STATES PATENTS

| | | | |
|---|---|---|---|
| 2,663,730 | 12/1953 | Hill et al. | 260—553 |
| 2,726,150 | 12/1955 | Wolter | 71—2.6 |
| 2,863,754 | 12/1958 | Wain | 71—2.6 |
| 2,876,088 | 3/1959 | Hill et al. | 71—2.6 |
| 3,164,632 | 1/1965 | Berger et al. | 260—553 |

LEWIS GOTTS, *Primary Examiner.*

JULIAN S. LEVITT, ELBERT L. ROBERTS, JAMES O. THOMAS, *Examiners.*